United States Patent [19]

Miericke

[11] 3,842,750

[45] Oct. 22, 1974

[54] ELECTRO-MAGNETIC SYSTEM FOR THE GUIDED SUSPENSION OF A MOVABLE VEHICLE

[75] Inventor: Jurgen Miericke, Nurnberg, Germany

[73] Assignee: Siemens Aktiengesellschaft, Munchen, Germany

[22] Filed: Jan. 18, 1973

[21] Appl. No.: 324,812

[52] U.S. Cl. .......................................... 104/148 SS
[51] Int. Cl. ............................................ B61b 13/08
[58] Field of Search ............... 104/148 MS, 148 SS; 335/216, 304

[56] References Cited
UNITED STATES PATENTS

| | | | |
|---|---|---|---|
| 1,843,518 | 2/1932 | Reime et al. | 335/304 |
| 3,483,493 | 12/1969 | Kafka | 335/216 |
| 3,589,300 | 6/1971 | Wipf | 104/148 SS |

FOREIGN PATENTS OR APPLICATIONS 1,035,764  7/1966  Great Britain .............. 104/148 MS Primary Examiner—M. Henson Wood, Jr.
Assistant Examiner—George H. Libman
Attorney, Agent, or Firm—Kenyon & Kenyon Reilly Carr & Chapin

[57] ABSTRACT

The electromagnetic system utilizes a magnetic loop to generate a magnetic field, a ferromagnetic return-circuit element and a stationary nonmagnetic reaction rail. The magnetic loop and return-circuit element are secured to the vehicle so that the vehicle can be lifted by the forces generated between the magnetic field and reaction rail and guided over the reaction rail during travel of the vehicle. The magnetic loop produces eddy currents in the nonmagnetic reaction rail whose magnetic repelling force serves as a lifting force for the vehicle.

3 Claims, 2 Drawing Figures

ELECTRO-MAGNETIC SYSTEM FOR THE GUIDED SUSPENSION OF A MOVABLE VEHICLE

FIELD OF THE INVENTION

This invention relates to an electromagnetic system for the guided suspension of a movable vehicle.

BACKGROUND OF THE INVENTION

Electromagnetic systems are known for the suspended guidance of moving vehicles. These systems generally are constructed with one of two magnetic-field configurations that interact with rail elements made of a material which has good electrical conductivity but which is, however, nonmagnetic and which for this reason may be termed reaction elements. In the case of the so-called normal-flux system, a magnetic field, produced by a loop or coil through which a current flows and which is installed usually below a vehicle, is moved through the intermediary of an arrangement of metal loops of a nonmagnetic material, possibly made as continuous rails. The magnetic field induces eddy currents in the rails which, in turn, produce a magnetic field directed counter to the excitation field. By means of these magnetic fields, the vehicle is repelled from the loops or rails by a lifting force which is proportional to the product of the rail current and the field component in the direction of the width of the rail element. The eddy-current loss, and thus the braking force produced, are, on the other hand, proportional to the square of the field component set perpendicularly to the rail-element area. In the case of the normal-flux system, this flux component is relatively great. Consequently, at the same time as the necessary lifting force is produced, great eddy currents, and correspondingly great braking forces, are also produced.

In the case of the so-called zero-flux system, known from U.S. Pat. No. 3,470,828, it is possible, by means of two oppositely polarized magnetic fields of the same strength, set opposite one another, to produce in the plane of symmetry a zone in which the induction in the direction of the thickness of the rails is zero, while the induction in the direction of the width of the rail and perpendicular to the direction of movement of the rail is, however, twice as great as in the case of a single coil. Should there be a deviation of the rail out of this zero-flux zone, the induction increases in the direction of the thickness of the rail, and consequently so does the flux in this direction. However, the induction in the direction of the length of the rail and perpendicular to the direction of movement remains almost constant in the case of small deviations. It is therefore possible, with relatively small rail-currents, to produce the same lifting force as with a normal-flux system. The ratio of braking force to lifting force is substantially smaller than with the normal flux system.

It is true that the zero-flux system has the advantage that the braking forces can be kept small, and that with a horizontal installation of the vehicle loops and of the reaction rail a stabilization of the system upward and downward is obtained. There is, however, one drawback in that two magnetic coils or loops are always needed, which are repelled with great forces. It is thus necessary to have a sufficiently stable mechanical design for the vehicle, requiring a corresponding expenditure. Furthermore, the rails must be situated between the two coils, and this creates mechanical problems in the supporting of the rails.

The normal-flux system has the advantage that only one vehicle loop is needed. Also, a simple design of rails is possible, for example, it is sufficient to have only one continuous plate that may be supported by resting on the ground. There is, however, a disadvantage since the great braking forces which occur have to be overcome by the drive.

Accordingly, it is an object of the invention to provide a magnetic system for the dynamic suspended guidance of a moving vehicle which has the advantages of the two known systems combined but which, at the same time, avoids to a great extent their drawbacks.

It is another object of the invention to provide a simple construction for an electromagnetic system for suspended guidance of a vehicle.

SUMMARY OF THE INVENTION

Briefly, the invention provides an electromagnetic system which includes a superconductive magnetic loop, a ferromagnetic return-circuit element disposed about and connected to the magnetic loop and a reaction element of nonmagnetic material disposed in the field of the magnetic loop within the ferromagnetic element and in parallel relation to the magnetic loop. The magnetic loop serves to generate a magnetic field while the ferromagnetic element forms a magnetic reflux for the field of the magnetic loop. At the same time, the ferromagnetic element forms the distribution of the field in the reaction element in such a way that the flux component in the direction of the thickness of the rail is small, and the flux component in the direction of the width of the rail is large. There are thus produced great lifting forces, and at the same time only small braking forces.

The return-circuit element which can be of U-shaped profile may advantageously be disposed so as to be closed in the direction of the passenger space of the vehicle. In this way, the element also forms a shield for the passenger space to the great magnetic field, particularly in the case of superconductive magnetic loops.

This electromagnetic system makes possible a simple construction of the magnetic loops of their connection to a vehicle, and also makes possible a simple construction of the reaction rail and of its support on a track bed. The repulsive force between the magnetic loop and the reaction rail serves as a force for lifting the vehicle while the weight of the vehicle represents the restoring force.

DESCRIPTION OF THE PREFERRED EMBODIMENT

Figure 1:
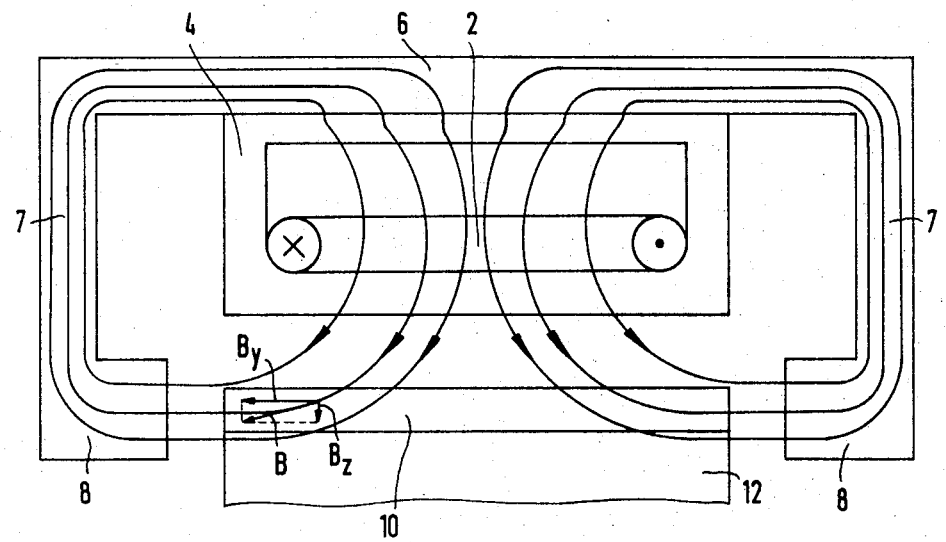
FIG. 1 illustrates a cross-sectional view of an electromagnetic system of the invention.

Referring to FIG. 1, the electromagnetic system includes a magnetic loop or coil 2 for high currents, such as a superconductive magnetic loop, which is housed within a suitable housing 4, a U-shaped ferromagnetic return-circuit element 6, and a reaction element 10 made of nonmagnetic material. The housing 4 is connected in any suitable fashion to the ferromagnetic element 6 so that the element 6 is disposed in surrounding relation about the loop 2. The housing 4 can also advantageously house a cooling device, of known construction, for the superconductive coil 2 or a cooling medium conduit which may run between the coil 2 and a tank for coolant (not shown) and housed, for example, in the substructure of a vehicle (not shown) on which the element 6 is carried.

The ferromagnetic return-circuit element 6 which is secured between the magnetic loop 2 and a vehicle (not shown) is adapted to move in the longitudinal direction of the reaction element 10 during movement of the vehicle perpendicular to the plant of the drawing. The element 6 includes a pair of depending legs 7 each of which carries a pole element or appendage 8 at the lower end. As shown, each pole appendage 8 has a face turned toward a narrow side of the reaction element 10. The cross-section of the return-circuit element 6 is made such that the ferromagnetic material, preferably iron, does not become saturated by the magnetic flux of the loop 2.

The reaction element 10 which may be in the form of a rail of rectangular cross-section is supported via a support 12 on a track element (not shown) so as to be disposed in the magnetic field of the magnetic loop 2.

In use, a large current which is generated in the magnetic loop 2 is intended to produce a magnetic field of, for example 2 T in the ferromagnetic return-circuit element 6. This flux extends perpendicularly in and out, respectively, at the faces of the pole element 8. At the same time, the loop 2 produces eddy currents in the reaction rail 10. As a result a magnetic induction B having a large horizontal component $B_y$ and a small vertical component $B_z$ is produced at the location of the reaction rail 10. With this pattern of field, the ratio of lifting force to braking force can be kept very small. If a force, such as the force of gravity of the vehicle (not shown) acts on the magnetic loop 2 in a downward direction then the reaction rail 10 becomes displaced upwardly relative to the magnetic loop 2 into a region in which both the horizontal component $B_y$ and also the vertical component $B_z$ of the magnetic induction, and thus also the lifting force, increase. The ferromagnetic return-circuit element 6 also includes the stray field of the magnetic loop 2. Therefore, in this magnetic system, a correspondingly high induction is obtained in the reaction rail 10 and, thus, also a greater lifting force.

Figure 2:
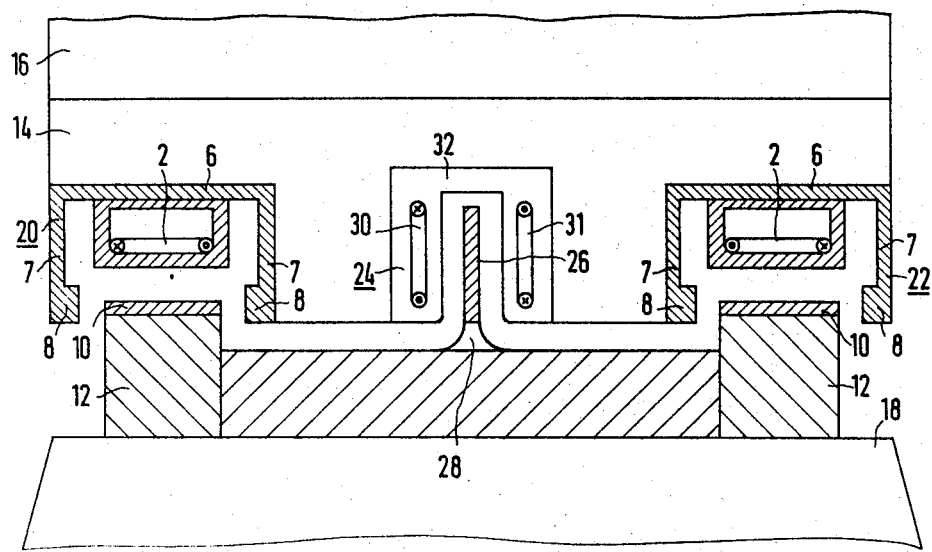
FIG. 2 illustrates a cross-sectional view of a vehicle incorporating a pair of electromagnetic systems according to the invention and a stabilizing system.

Referring to FIG. 2, wherein like reference characters indicate like parts as above, a vehicle 16 has an electromagnetic system 20,22 as above described, disposed on both sides of the substructure 14 of the vehicle 16. These two magnetic systems 20, 22, in cooperation with the loops 2 and the reaction rail 10, produce a lifting force for the vehicle 16. The reaction rails 10 may be fastened to a common rail-base 12 which rests upon a track bed 18. In addition, a vertically-set stabilized rail 26 made of nonmagnetic material is secured between the reaction rail 10. This stabilizing rail 26 is fastened by means of a support 28 to the base 12, and provides a means for the lateral stabilization of the vehicle 16. This stabilizing rail 26 can, for example, in cooperation with two magnetic loops 30, 31, which are preferably superconductive coils, form a stabilizing system 24 that acts as a zero-flux system. The magnetic loops 30, 31 should be kept at a cryogenic temperature by means of a cooling system (shown as an embedding 32 for the loops). As soon as the vehicle moves to the right or left out of a central position, the magnetically counterconnected coils 30, 31 produce restoring forces in a known manner that bring the vehicle 16 back into the central position so that the stabilizing rail 26 is situated in the zero-flux zone of the magnetic system 24.

A particular advantage of the arrangement of magnetic systems according to FIG. 2, i.e. with a lifting system 20, 22 and a supplementary lateral stabilization system 24 is that the stabilizing rail 26 can also serve simultaneously as a reaction rail for a drive, e.g. a linear motor (not shown).

Instead of the magnetic system 24, it is possible to provide any other system for the stabilization of the vehicle 16.

What is claimed is:

1. An electromagnetic system for the guided suspension of a movable vehicle comprising a superconductive magnetic loop for generating a magnetic field;

a ferromagnetic element of U-shaped profile disposed about and connected to said magnetic loop, said ferromagnetic element having a pair of legs disposed on opposite sides of said magnetic loop; and a reaction element of a conductive nonmagnetic material disposed in said field of said magnetic loop between said legs of said ferromagnetic element and in parallel relation to said magnetic loop.

2. An electromagnetic system as set forth in claim 1 wherein said reaction element has opposite narrow sides in facing relation to said legs and each said leg includes a pole appendage thereon having a face turned toward one of said narrow sides.

3. The combination of an electromagnetic system as set forth in claim 1 and a vehicle wherein said ferromagnetic element is disposed between said vehicle and said magnetic loop.

* * * * *

UNITED STATES PATENT OFFICE
CERTIFICATE OF CORRECTION

Patent No. 3,842,750  Dated October 22, 1974

Inventor(s) Jürgen Miericke

It is certified that error appears in the above-identified patent and that said Letters Patent are hereby corrected as shown below:

On page 1, please revise to include paragraph [30]

-- Foreign Application Priority Data

Germany ........January 24, 1972 .........P 22 03 203.7

Signed and sealed this 1st day of April 1975.

(SEAL)
Attest:

RUTH C. MASON
Attesting Officer

C. MARSHALL DANN
Commissioner of Patents
and Trademarks